Patented June 25, 1940

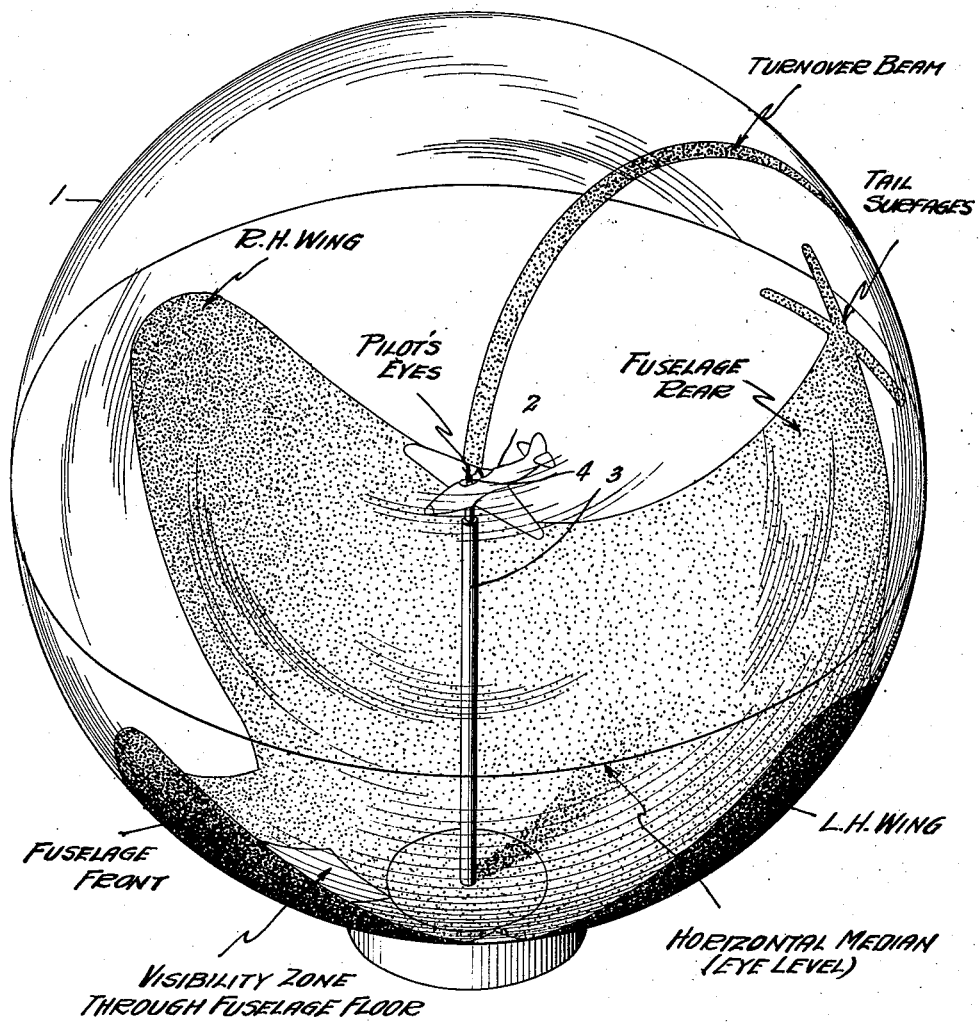

2,205,961

UNITED STATES PATENT OFFICE 2,205,961

VISION GLOBE AND METHOD OF ILLUSTRATING VISIBILITY

Albert M. Patterson, Jr., and Nelson S. Riley, Jr., Buffalo, N. Y., assignors to Bell Aircraft Corporation, Buffalo, N. Y., a corporation of New York Application September 14, 1938, Serial No. 229,948

6 Claims. (Cl. 35—1)

This invention relates to a method and apparatus for illustrating the range of visibility for a person positioned at a point above the ground level, and more particularly to a method and apparatus for illustrating the visibility in all directions afforded to the pilot of any type of aircraft.

One of the objects of this invention is to provide a globe in which is mounted an airplane model or other point of observation in such a manner that the eye of the observer whose vision is to be illustrated is theoretically located at the exact center of the globe.

Another object of our invention is to provide a method of illustrating the visibility of the observer mentioned above by shading the portion of the globe which is normally invisible to his sight.

A further object of our invention is to provide a method of locating the shaded areas on the globe by constructing the airplane or other point of observation to scale and placing a light at the center of the globe, the shadows produced by the said airplane being at points which are invisible to the observer's eye.

With these and other objects in view, our invention consists in providing a globe in which is placed a scaled model of an airplane or other observation unit in which theoretically an observer could be stationed. This scaled model is mounted in the globe in such a manner that the eye of the observer is presumed to be in the exact center of the globe.

As the model is constructed to scale, the visibility of the observer may be ascertained by placing a light at the normal position of the observer's eyes and tracing the resulting shadows thrown on the globe. These shaded places coincide with the points which are invisible to the observer.

In the drawing the figure illustrates a transparent or translucent hollow globe in which is mounted a model airplane constructed to scale.

As shown in the drawing a practical application of our invention consists of a hollow transparent globe, generally indicated by the numeral 1, in which a model airplane 2 is mounted on a pedestal 3. This model airplane 2 is mounted in such a manner that the portion of the fuselage in which a pilot is usually mounted is positioned in the exact center of the globe.

The range of visibility of the pilot is now indicated by painting or otherwise shading that portion of the globe which is not visible to the pilot. The portion which should be shaded may be ascertained in any suitable manner, such as by placing a small light 4 at the position normally occupied by the observer's eyes, that is, the exact center of the globe, and tracing the shadow thrown by the airplane. A horizontal meridian line is also traced on the globe. This line is drawn through points which are on the same horizontal plane as the central point of the globe.

The shaded portion is not the actual area which would be invisible from an airplane of the size of the scale model, as in order to determine the actual area it would be necessary to use a substantially plane surface. However, all of the invisible area is included in the shaded area and this area may be used for determining the relative area of visibility of the scale model. This is especially important when the area of visibility of two or more scale models is being compared.

From the above description it is believed obvious that the vision of an observer positioned at any part of an airplane may be tested by simply mounting the airplane in such a manner that the portion of the plane in which the observer whose vision is to be tested is located will be positioned directly at the center of the globe. In a like manner, the zone of visibility, due to the use of a visible floor porthole in the fuselage of the plane, may be shown on the globe.

The plane may be suspended in the center of the globe by the use of wires or any other suitable means, and in place of an airplane a balloon or any other construction which would support an observer can be used.

From the above description it is believed apparent that the form of our invention shown in the drawing is merely to illustrate one practical use of this invention, and that it is not intended that our invention be limited in any manner to the specific construction shown in this drawing. For this reason we wish it understood that we intend this application to be only limited by the prior art and the scope of the appended claims.

We claim:

1. In a device for indicating the range of non-visibility of an observer under actual conditions, the combination of a globe, a scale model of an observation structure positioned at the point of intersection of the central axes of the globe, a light source positioned at a point on the scale model which corresponds to that occupied by the eye of an observer on the full sized observation structure, so as to cause a shadow on the interior surface of the globe.

2. In a device for indicating the range of non-visibility of an observer under actual conditions, the combination of a globe, a scale model of an airplane positioned at the point of intersection of the central axes of the globe, a light source positioned at a point on the scale model which corresponds to that occupied by the eye of an observer in the full sized airplane, and means to light so as to cause a shadow on the interior surface of the globe.

3. In a device for indicating the range of non-visibility of an observer under actual conditions, the combination of a hollow translucent body having continuous walls, a scale model of an observation structure positioned at approximately the center of the translucent body, and a light source positioned at a point on the scale model which corresponds to that occupied by the eye of an observer on a full size observation structure, so as to cause a shadow on the interior surface of the body.

4. In a device for indicating the range of non-visibility of an observer under actual conditions, the combination of a hollow translucent body having continuous walls, a scale model of an airplane positioned at approximately the center of the translucent body, and a light source positioned at a point on the scale model which corresponds to that occupied by the eye of an observer on a full size airplane, so as to cause a shadow on the interior surface of the body.

5. The method of determining the relative areas of non-visibility from a plurality of airplanes comprising the steps of successively placing a scale model of each airplane within a translucent body, and then placing a light in the model at the normal position of an observer thereby projecting the shadow caused by the opaque portions of the model on the translucent body.

6. The method of determining the relative areas of non-visibility from a plurality of observation structures comprising the steps of successively placing a scale model of each observation structure within a translucent body and placing a light in the model at the normal position of an observer thereby projecting a shadow caused by the opaque portions of the model on the translucent body.

ALBERT M. PATTERSON, Jr.
NELSON S. RILEY, Jr.